United States Patent [19]

Bahn

[11] Patent Number: 5,109,184
[45] Date of Patent: Apr. 28, 1992

[54] DIRECT CURRENT MOTOR

[75] Inventor: Itsuki Bahn, Shibuya, Japan

[73] Assignee: Kabushikigaisha Sekogiken, Tokyo, Japan

[21] Appl. No.: 474,096

[22] PCT Filed: Sep. 12, 1989

[86] PCT No.: PCT/JP89/00933
    § 371 Date: May 9, 1990
    § 102(e) Date: May 9, 1990

[87] PCT Pub. No.: WO90/02727
    PCT Pub. Date: Mar. 22, 1990

[30] Foreign Application Priority Data

Sep. 12, 1988 [JP] Japan .................. 63-226514

[51] Int. Cl.⁵ .................................... H02K 41/00
[52] U.S. Cl. ............................ 318/254; 318/280
[58] Field of Search ............. 318/135, 138, 139, 254, 318/254 A, 444, 439, 647, 671, 280–286; 310/12, 17, 19

[56] References Cited

U.S. PATENT DOCUMENTS

| | | | |
|---|---|---|---|
| 4,446,406 | 5/1984 | Uzuka | 318/254 |
| 4,508,998 | 4/1985 | Hahn | 318/254 X |
| 4,563,622 | 1/1986 | Deavers et al. | 318/254 |
| 4,645,991 | 2/1987 | Ban et al. | 318/138 X |
| 4,743,813 | 5/1988 | Tassinario | 318/138 |
| 4,958,115 | 9/1990 | Miller | 318/662 |

*Primary Examiner*—Stanley J. Witkowski
*Assistant Examiner*—A. Jonathan Wysocki
*Attorney, Agent, or Firm*—Staas & Halsey

[57] ABSTRACT

A small and inexpensive 3-phase Y-connection direct current motor operable at high speeds with high efficiency. The motor includes a current supply controlling circuit that receives first to third position detection signals from a position detection device having three Hall elements for detecting the position of a rotor, and fourth to sixth position detection signals supplied from the device [and having .currents to the armature coils of respective phases in the forward and reverse directions. When the current supply to one of the armature coils is interrupted at the end of a corresponding position detection signal, magnetic energy stored in the armature coil is supplied to another armature coil which is to be supplied with current by a next position detection signal, thereby rapidly extinguishing the magnetic energy and causing the current supply width required for the armature current to rise to a preset value to an extremely small width so as to eliminate the reduced-torque in the initial stage of the current supply and the countertorque in the end stage of the current supply.

16 Claims, 6 Drawing Sheets

5,109,184

DIRECT CURRENT MOTOR

TECHNICAL FIELD

The present invention relates to a direct current motor, which is employed, for instance, as a driving source for constant speed drive, constant torque drive or servo control in various industrial instruments, and more particularly, to a high-speed 3-phase direct current motor.

BACKGROUND ART

Conventionally, (brushless motors), which include induction motors using inverters, semiconductor motors and colorless motors having a small inductance, are employed as high speed motors. However, a motor of this kind is large in size and high in cost because it generally comprises a direct current power source for rectifying an output from an alternating current power source. The above defect becomes significant, particularly, in the case of a motor including an inverter. Further, the maximum rotation speed of the conventional electric motor varying from approximately 3000 to 6000 rpm decreases below the above rotation speed when the motor is arranged to generate a high power output. When an increased voltage is applied to the electric motor so as to increase the rotation speed, the efficiency of the electric motor is lowered to the extent that it becomes particularly useless. Heretofore, no electric circuit is provided, which is adapted to be mounted on the motor for constant torque driving, constant speed driving or servo control and is stably operable at high speeds. In particular, efficiently operable one is not developed.

SUMMARY OF THE INVENTION

An object of the present invention is to provide a direct current motor, which is operable at high rotation speeds with high efficiency, and is small in size and low-priced.

Another object of the present invention is to provide a direct current motor whose output torque can be variably controlled.

In order to achieve the above objects, one aspect of the present invention comprises: a position detection device for sequentially supplying a plurality of position detection signals, corresponding in number to phases of a direct current motor and associated with the respective phases of the direct current motor, in dependence on a rotation position of a rotor of the direct current motor; a current supply controlling circuit connected to a direct current power source, for sequentially supplying currents to armature coils of respective phases in response to the position detection signals; and circuit means for supplying a magnetic energy stored in one of the armature coils which is interrupted to be supplied with current into a next one of the armature coils which is to be next supplied with current at the time of interruption of current supply to the armature coil of respective phase, thereby rapidly extinguishing the stored magnetic energy and rapidly raising an armature current flowing in the armature coil to be next supplied with current.

Another aspect of the present invention comprises: a position detection device for sequentially supplying a first position detection signal group including a plurality of position detection signals corresponding in number to phases of a direct current motor and associated with respective phases of the direct current motor and a second position detection signal group including a plurality of position detection signals with preset phase differences with respect to the corresponding position detection signals of the first position detection signal group, in dependence on a rotation position of a rotor of the direct current motor; a current supply controlling circuit connected to a direct current power source, for sequentially supplying currents to armature coils of respective phases in a forward direction in response to the first position detection signal group, and for sequentially supplying currents to the armature coils of respective phases in a reverse direction in response to the second position detection signal group; and circuit means for supplying a magnetic energy stored in one of the armature coils which is interrupted to be supplied with current into a next one of the armature coils which is to be next supplied with current at the time of interruption of current supply to the armature coil of respective phase, thereby rapidly extinguishing the stored magnetic energy and rapidly raising an armature current flowing in the armature coil to be next supplied with current.

Preferably, the direct current motor is a 3-phase Y-connection direct current motor. Preferably, the direct current motor further includes a chopper circuit for interrupting current supply to the armature coil of respective phase when the armature current flowing in the armature coil of respective phase becomes larger than an upper limit value, and for restarting the current supply when the armature current becomes smaller than a lower limit value. Preferably, the position detection device is so arranged as to sequentially and successively generate the position detection signals without superposing the position detection signals in time, and each of the position detection signals has a preset width. Preferably, the position detection device includes a plurality of position detection elements corresponding in number to the phases of the direct current motor, separated from each other by a preset electrical angle and fixed on an armature side of the direct current motor so as to generate the position detection signals. More preferably, each of the position detection elements is fixed in that position at which each element is enabled to generate the position detection signals causing the current supply to the armature coil of respective phase to be effected in the maximum torque generation range. Preferably, the current supply controlling circuit includes transistor bridge circuits respectively connected to the armature coils of the respective phases for turning on and off each of transistors constituting the transistor bridge circuit in response to a corresponding position detection signal. Preferably, the circuit means includes a diode group connected between the direct current power source and the armature coils of respective phases, for preventing the magnetic energy from being returned to the direct current power source.

As described above, according to the present invention, since the magnetic energy stored in the armature coil which is interrupted to be supplied with current is supplied to the armature coil to be next supplied with current so as to rapidly extinguish the magnetic energy stored in the armature coil and rapidly raise the armature current flowing in the armature coil to be next supplied with current, generation of coutertorque due to the stored magnetic energy and decrease in the torque (generation of reduced torque) due to the delay of rise in the armature current can be prevented, and therefore, the rotation speed of the electric motor can be increased and the efficiency thereof can be enhanced. Further, since current supply to the armature coil of each phase is controlled by two position detection signal groups, the current supply controlling circuit can be simplified in construction and the cost of the device can be lowered. Preferably, since the armature current or the output torque of the electric motor is controlled within a preset range by using the chopper circuit, the output torque and the rotation speed of the electric motor, determined by a voltage applied from the direct current power source to the current supply controlling circuit, can be controlled independently from each other. Therefore, in the case of employing a direct current power source of a type rectifying an alternating current, a capacitor with a small capacitance can be used as a smoothing capacitor accommodated in the direct current power source, thus making the device small in size and low-priced.

DESCRIPTION OF THE PREFERRED EMBODIMENTS

With reference to FIGS. 1 to 5, a 3-phase Y-connection semiconductor electric motor, according to a first embodiment of the present invention, will be explained. In the following explanation, an angle is represented by an electrical angle.

Figure 1:
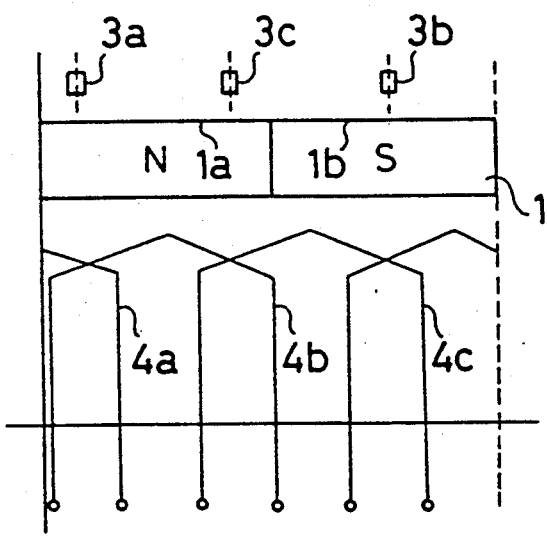
FIG. 1 is an exploded diagram showing a magnet rotor and armature coils of a direct current motor according to a first embodiment of the present invention.
Figure 2:
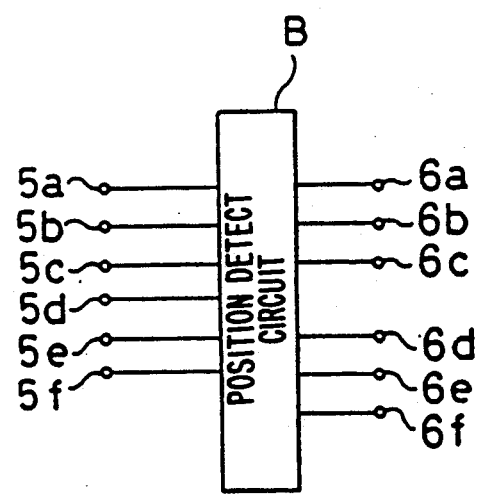
FIG. 2 is a block circuit diagram showing a logic circuit, which cooperates with the position detection elements of FIG. 1 to constitute a position detection device.

The electric motor of the present invention includes the main body of an electric motor, having a magnet rotor 1 and first-phase to third-phase armature coils 4a-4c shown in the developed form in FIG. 1, and a position detection device for detecting the rotation position of the rotor 1. The position detection device includes Hall elements (position detection elements) 3a-3c shown in FIG. 1, and a logic circuit B shown in FIG. 2.

The Hall elements 3a-3c are fixed on the armature side of the main body of the electric motor, in a manner separated from one another by 120 degrees and facing poles 1a and 1b of the rotor 1. The logic circuit B, which is arranged to generate six series of position detection signals for driving the motor in response to electrical output signals of the Hall elements 3a-3c, is constructed in a conventional manner. That is, the logic circuit B is arranged to be supplied at each of input terminals 5a-5f thereof with corresponding one of electric signals output from the Hall elements 3a-3c and electric signals obtained by inverting the output electric signals via conventional amplifier means (not shown), and generate position detection signals based on these electric signals and output the same via output terminals 6a-6f of the logic circuit. The Hall elements 3a-3c are fixed in that position at which these elements are enabled to generate position detection signals causing the current supply to the armature coil of each phase to be effected in the maximum torque generation range of the electric motor.

Figure 3:
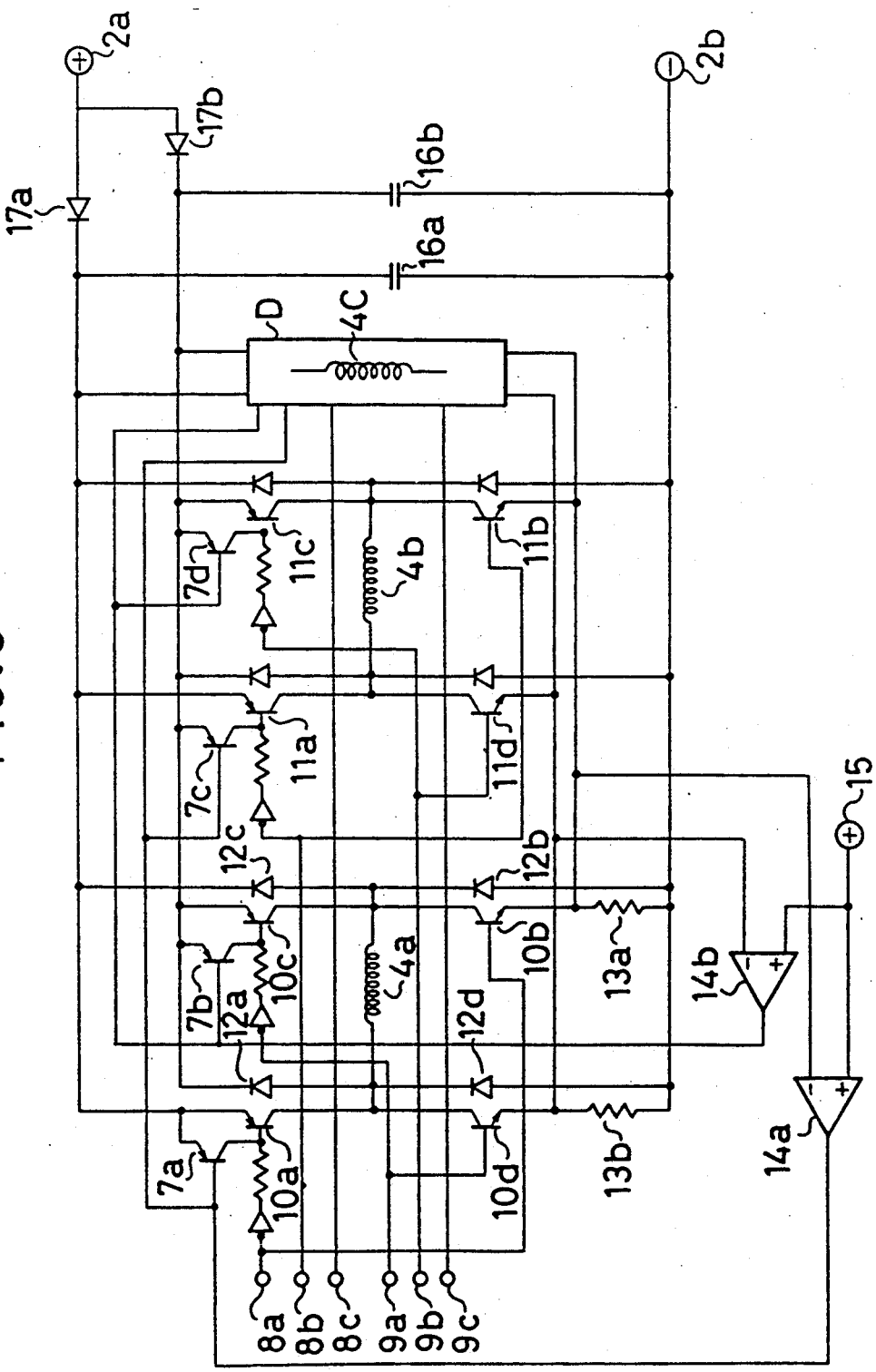
FIG. 3 is a circuit diagram showing a current supply controlling circuit for use with the position detection device shown in FIGS. 1 and 2.

The direct current motor further includes a current supply controlling circuit shown in FIG. 3 for controlling current supply to the armature coils 4a-4c of the first-phase to third-phase, and a direct current power source for supplying electric power to this circuit. The current supply controlling circuit includes input terminals 8a-8c and 9a-9c respectively connected to the output terminals 6a-6f of the logic circit B, and operational amplifiers 14a and 14b. In FIG. 3, reference numeral 15 denotes a reference positive voltage output terminal which is connected to the positive input terminals of the operational amplifiers 14a and 14b.

There will now be described a circuit construction relating to the first-phase armature coil 4a in the current supply controlling circuit.

The armature coil 4a has one end connected to a collector of a transistor 10a whose emitter is connected to a positive terminal 2a of the direct current power source via a diode 17a and whose base is connected to the input terminal 8a of the current supply controlling circuit via a resistor and an inverting circuit. The input terminal 8a is connected to the base of a transistor 10b whose emitter is connected to a negative terminal 2b of the direct current power source via a resistor 13a and at the same time connected to an emitter of another transistor 10d via the resistors 13a and 13b. The collector and base of the transistor 10d are respectively connected to a connection node between the armature coil 4a and the transistor 10a and the input terminal 9a of the current supply controlling circuit. Further, the collector of the transistor 10b is connected to a connection node between the armature coil 4a and the collector of the transistor 10c, and the emitter of the transistor 10c is connected to the positive terminal 2a of the direct current power source via a diode 17b and the base thereof is connected to the input terminal 9a of the current supply controlling circuit via a resistor and an inverting circuit. Further, the anode of a diode 12a and the cathode of a diode 12d are respectively connected to a connection node between the armature coil 4a and the transistor 10a and a connection node between the armature coil 4a and the transistor 10(d). The cathode of the diode 12a is connected to a connection node between the transistor 10c and a diode 17b, and the anode of the diode 12d is connected to a connection node between the resistors 13a and 13d. The cathode of a diode 12b whose anode is connected to the negative terminal 2a of the direct current power source and to the connection node between the resistors 13a and 13b is connected to a connection node between the armature coil 4a, the transistors 10b and 10c and a diode 12c, and the cathode of the diode 12c is connected to a connection node between the transistor 10a and the diode 17a.

Moreover, a connection node between the transistor 10b and the resistor 13a is connected to the negative input terminal of the operational amplifier 14a whose output terminal is connected to the base of the transistor 7a. The collector and emitter of the transistor 7a are respectively connected to the base and emitter of the transistor 10a. Further, a connection node between the transistor 10d and the resistor 13b is connected to the negative input terminal of the operational amplifier 14b whose output terminal is connected to the base of the transistor 7b. The collector and emitter of the transistor 7b are respectively connected to the base and emitter of the transistor 10c. Furthermore, capacitors 16a and 16b are respectively connected between the diode 17a and the negative terminal 2b of the direct current power source and between the diode 17b and the negative terminal 2b.

Since the constructions of the current supply controlling circuits associated with the second-phase and third-phase armature coils 4b and 4c are the same as that of the circuit associated with the armature coil 4a, the explanation therefor is omitted. In FIG. 3, reference numerals 7c, 7d, and 11a-11d indicate elements corresponding to the elements 7a, 7b, and 10a-10d, and a block D indicates a circuit associated with the armature coil 4c. The armature coil 4a and transistors 10a-10d constitute a bridge circuit, the armature coil 4b and the transistors 11a-11d also constitute a bridge circuit, and a similar bridge circuit is included in the block circuit D. Further, the transistor 7a associated with the armature coil 4a and transistors corresponding thereto and associated with the armature coils 4b and 4c cooperate with the operational amplifier 14a and resistor 13a to constitute a chopper circuit for effecting chopper control mentioned later.

Now, the operation of the direct current motor with the above construction is explained.

When the rotor 1 is rotated, rectangular electric signals 25, 27 and 29 (FIG. 5) are respectively delivered from the Hall elements 3a-3c and supplied to the input terminals 5a, 5c and 5e of the logic circuit B, respectively. These electric signals are set at a high level (indicated by symbols 25a, 25b, 27a, 27b, 29a, 29b in FIG. 5) when the Hall elements 3a-3c are placed in the magnetic field of the magnetic pole (S pole) 1b. Further, electric signals 26, 28 and 30 obtained by inverting the above electric signals by the use of elements, not shown, are supplied to the input terminals 5b, 5d and 5f of the logic circuit B. The electric signals 25a-30b of high level each have a width of 180 degree, and adjacent signals (for example, signals 25a and 25b) are separated from each other by 180 degree. The logic circuit B generates first to sixth position detection signals 31-36 from the electric signals 25-30, and delivers the same from its output terminals 6a-6f to the input terminals 8a-8c and 9a-9c of the current supply controlling circuit of FIG. 3.

At this time, if an input signal of high level is supplied to the input terminal 8a of the current supply controlling circuit, the transistors 10a and 10b are turned on. As a result, the opposite ends of the armature coil 4a are respectively connected to the positive terminal 2a and the negative terminal 2c of the direct current power source, and current is supplied to the armature coil 4a in a forward direction (to the right in FIG. 3). Further, if an input signal of high level is supplied to the input terminal 9a, the transistors 10c and 10d are turned on to permit current to be supplied to the armature coil 4a in a reverse direction (to the left). If an input signal of high level is supplied to the terminals 8b and 9b under the same condition, the armature coil 4b is supplied with current in a forward or reverse direction. This also applies to the armature coil 4c. As is understood from the above explanation, current supply to the armature coils 4a-4c in the forward direction is sequentially effected over the width of the position detection signal curves 31a, 31b, —, curves 32a, 32b, —, and curves 33a, 33b, —. Further, current supply to the armature coils 4a-4c in the reverse direction is sequentially effected over the width of the position detection signal curves 34a, 34b, —, curves 35a, 35b, —, and curves 36a, 36b, —.

Figure 4:
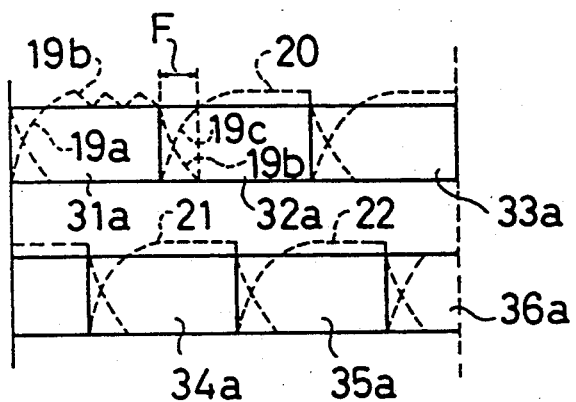
FIG. 4 is a timing chart showing, by way of example, position detection signals supplied from the logic circuit of FIG. 2.

Next, with reference to FIG. 4, the current supply to the armature coil 4a in the forward direction at the time of application of the first position detection signal 31a of high level will be further described.

As mentioned above, when the first position detection signal of high level indicated by the curve 31a is supplied to the input terminal 8a of the current supply controlling circuit so that the transistors 10a and 10b are turned on, current is supplied to the armature coil 4a in the forward direction. At an initial stage of the current supply, the armature current rises as indicated by broken lines 19a in FIG. 4 because of the inductance of the armature coil 4a. At this time, a voltage drop which is proportional to the armature current occurs in the resistor 13a, and therefore, the voltage drop represents the magnitude of the armature current.

If the voltage drop in the resistor 13a exceeds the reference positive voltage which is applied from a reference positive output terminal 15 to the positive input terminal of the operational amplifier 14a, then the output of the operational amplifier 14a is changed from the high level to the low level, rendering the transistors 7a and 10a conductive and non-conductive, respectively. At this time, magnetic energy stored in the armature coil 4a is discharged as current flowing along a closed circuit constituted by the armature coil 4a, transistor 10b, resistor 13a, diode 12d and armature coil 4a. As a result, the armature current is reduced.

As the armature current is reduced, a voltage drop in the resistor 13a or a voltage applied to the negative terminal of the operational amplifier 14a is gradually decreased. When the applied voltage has decreased from the a preset value corresponding to the reference positive voltage to a predetermined value determined by the hysteresis characteristic of the operational amplifier 14a, an output of the operational amplifier 14a is returned to a high level, thereby causing the transistors 7a and 10a to be turned off and on, respectively. Therefore, the armature current of the armature coil 4a increases. When the armature current has increased to a preset value again, the transistor 7a is again turned on and the transistor 10a is turned off, and the armature current is gradually decreased. In this way, the operational amplifier 14a, resistor 13a and transistor 7a function as a chopper circuit for repeatedly effecting the above cycle, and the armature current becomes a pulsating current. The upper limit of the armature current is controlled by a voltage of the reference positive voltage terminal 15.

After this, when the first position detection signal 31a of high level falls, the transistors 10a and 10b are turned off. At this time, current caused by magnetic energy stored in the armature coil 4a flows in a closed circuit formed of the armature coil 4a, diode 12c, capacitor 16a, diode 12d and armature coil 4a so as to charge the capacitor 16a. At the same time as the fall of the signal 31a, the second position detection signal 32a of high level is applied to the input terminal 8b of the current supply controlling circuit, and thus the transistors 11a and 11b are turned on. The above-described magnetic energy causes the current flowing at the time of supplying current to the armature coil 4b to be rapidly raised (indicated by a broken line 19c in FIG. 4). Further, the magnetic energy stored in the armature coil 4a is discharged as indicated by a broken line 19b. On this occasion, the operation of charging and discharging the capacitor 16a is effected only within a period associated with the discharge of the stored magnetic energy, indicated by the broken line 19b, and with the storage of the magnetic energy, indicated by the broken line 19c. Therefore, the capacitance of the capacitor 16a can be made small and can be sometimes omitted.

In case that the period indicated by an arrow F in FIG. 4 exceeds 30 degrees, a countertorque caused by the delay in the fall of the armature current indicated by the end portion of the broken line 19b is generated, and the torque is reached (generation of reduced-torque) because of the delay in the rise of the armature current indicated by the starting portion of the broken line 19c. As a result, the rise in the rotation speed is suppressed and the efficiency is lowered. With this point taken into consideration, in the device of the present embodiment, one or both of the power source voltage (voltage of the terminal 2a) and the capacitance of the capacitor 16a are adjusted to freely change the width of the arrow F. That is, a voltage appearing at the positive terminal 2a of the direct current power source is increased, and/or the capacitance of the capacitor 16a is decreased to reduce the width of the arrow F. As a result, the electric motor can be rotated at high speeds, and generation of countertorque and reduced-torque and degradation in the efficiency can be prevented.

For example, in the case of the electric motor having an output of 300 watt, the widths of the rise and fall of the armature current can be held below 20 microseconds by removing the capacitors 16a and 16b or setting the capacitance thereof to approx. 0.1 microfarad. In this case, the electric motor can be rotated at a speed of approx. 1000,000 revolutions per minute.

The operation of controlling current supply in the forward direction in the armature coils 4b and 4c are effected in the same manner as in the case of the armature coil 4a. That is, the chopper control for the armature current flowing in the armature coil 4b is effected in a period of the broken line 20 by means of a chopper circuit formed of the operational amplifier 14a, resistor 13a and transistor 7c, so that the value of the armature current is restrictecd in accordance with the reference positive voltage applied to the reference voltage terminal 15. Further, the chopper control for the armature current flowing in the armature coil 4c is effected by means of a chopper circuit formed of the operational amplifier 14a, resistor 13a and a transistor (corresponding to the transistors 7a and 7c) contained in the block circuit D. When a third position detection signal 33a is applied to the input terminal 8c of the current supply controlling circuit at the same time as the fall of the second position detection signal 32a, the current supply in the forward direction in the armature coil 4c is effected in exactly the same manner as in the case described above. At this time, as shown by the broken line in FIG. 4, the armature current flowing in the armature coil 4b falls, and at the same time, the armature current flowing in the armature coil 4c rises.

Further, the current supply to the armature coil of each phase in the reverse direction is controlled on the basis of the first to third position detection signals (first position detection signal group), in a similar manner to the control of the current supply in the forward direction. That is, when any one of the fourth to sixth position detection signals (second position detection signal group) 34a-36a shown in FIG. 4 is applied to a corresponding one of the input terminals 9a-9c of the current supply controlling circuit, the control of the current supply in the reverse direction in connection with the armature coil 4a, 4b or 4c is effected by means of the transistors 10c, 10d and 7b; or transistors 11c, 11d and 7d; or corresponding elements in the block circuit D. Then, the operational amplifier 14b, reference positive voltage terminal 15, capacitor 16b, diode 17b and diodes connected in parallel with the respective transistors with the polarities thereof reversed are operated in the same manner as in the control of the current supply in the forward direction, and the same effect can be attained. The chopper control is effected in a period indicated by the broken lines 21 and 22 in FIG. 4.

Figure 5:
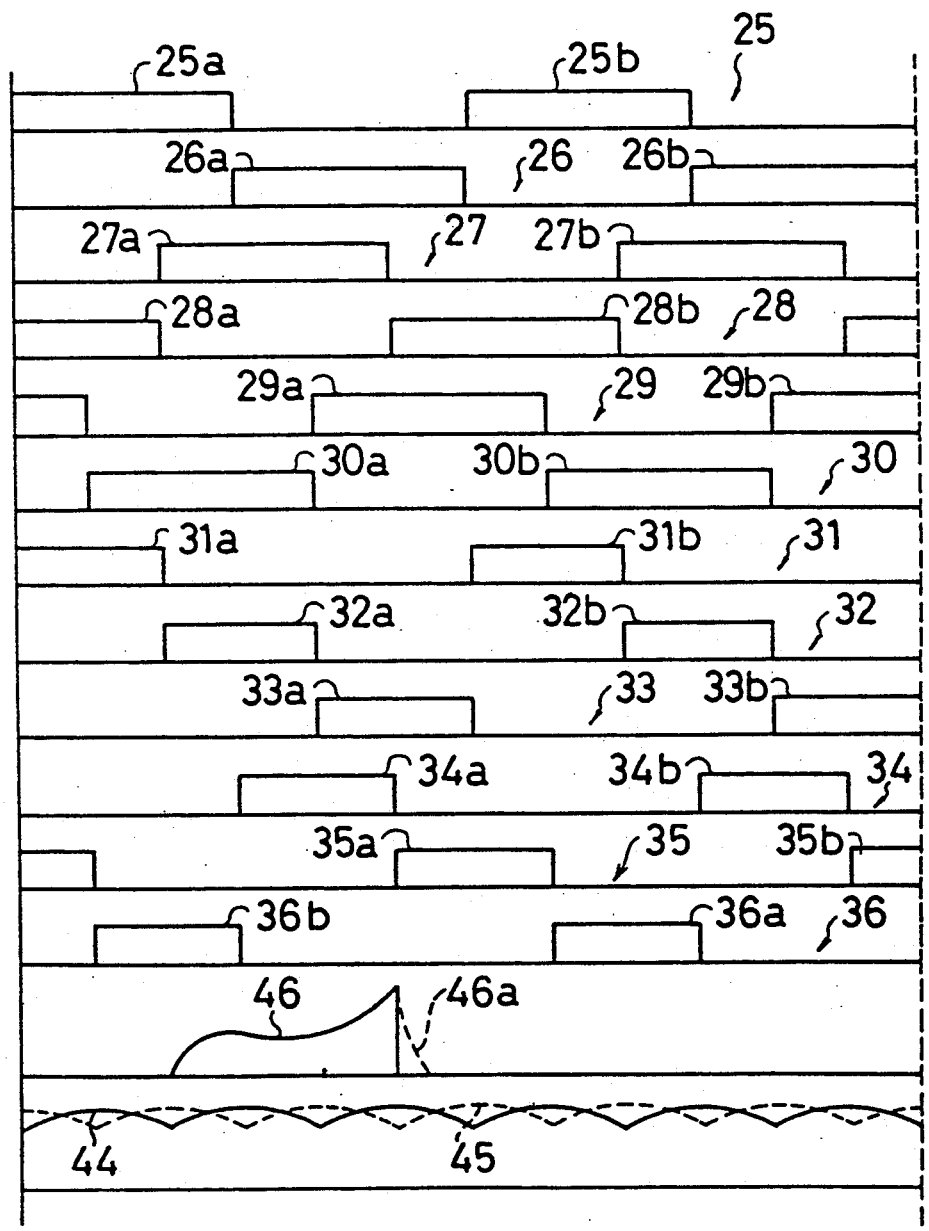
FIG. 5 is a timing chart showing, by way of example, electrical signals supplied from the position detection elements of FIG. 1, and the output torque and the armature current of the main body of the electric motor.

Curves 44 and 45 in FIG. 5 respectively show output characteristics of the electrical motor at the time of current supply in the forward and reverse directions, and symbols 46 and 46a show armature current curves in the case of effecting the current supply over a current supply width of 180 degrees. In this embodiment, the armature coil of each phase is supplied with current over a current supply width of 120 degrees, and the current supply is effected only in a region corresponding to the central portion of the curve 46 so that the driving efficiency of the electric motor can be enhanced. On the other hand, when the energization width is 180 degrees, the current supply is effected as shown by the curve 46a by the discharging of the magnetic energy, causing a countertorque to be generated. In this way, if the current supply time after the extinction of the position detection signal is long, the countertorque is generated and the efficiency of the electric motor is lowered. According to this emdodiment, such a defect can be eliminated.

As described above, according to the present embodiment, since the current supply control in the forward and reverse directions with respect to the armature coil of each phase is effected by two-series of current supply controlling circuits, the circuit construction can be simplified. Further, since position detection signals constituting the first and second position detection signal groups have a width of 120 degrees and a sequence of position detection signals are successively generated without being superposed, the width of fall of the armature current flowing in the armature coil which is interrupted from being supplied with current and the width of rise of the armature current flowing in the armature coil to which current is started to be supplied can be set within 30 degrees, by simply adding the diodes 17a, 17b and capacitors 16a, 16b to the current supply controlling circuit, thus attaining a high speed and highly efficient electric motor. Moreover, since the armature current (output torque) is controlled by the reference positive voltage and is not dependent on a voltage applied from the direct current power source to the current supply controlling circuit, only the chopper frequency may be influenced even when ripple components are contained in the direct current power source voltage.

Therefore, the capacitance of a smoothing capacitor used for rectifying the alternating current power source voltage can be made small. In the case of a 3-phase alternating current power source, the capacitance can be made further small, and hence the power source section can be made small in size. Further, since it is not necessary to use only the portion near the peak value of the sine wave voltage of the alternating current power source and it is possible to use the portion having a width of approx. one half that of the sine wave, electrical noises can be suppressed and the power factor can be increased.

Now, a 3-phase direct current motor according to a second embodiment of the present invention will be explained.

The electric motor of this embodiment is different form the first embodiment in a point that a current supply controlling circuit having no chopper circuit is used. That is, the electric motor of this embodiment is provided with a current supply controlling circuit shown in FIG. 6. This current supply controlling circuit is basically the same in construction as that of FIG. 3, but the chopper circuit (operational amplifiers 14a and 14b, terminal 15 and transistors 7a, 7b, 7c and 7d) of FIG. 3 is omitted. Since the armature current will vary when a ripple is contained in a voltage supplied from the direct current power sources 2a and 2b, it is preferable to use a direct current power source, such as a battery power source, which can supply a constant voltage in the device of this embodiment without the chopper control for the armature current.

Figure 6:
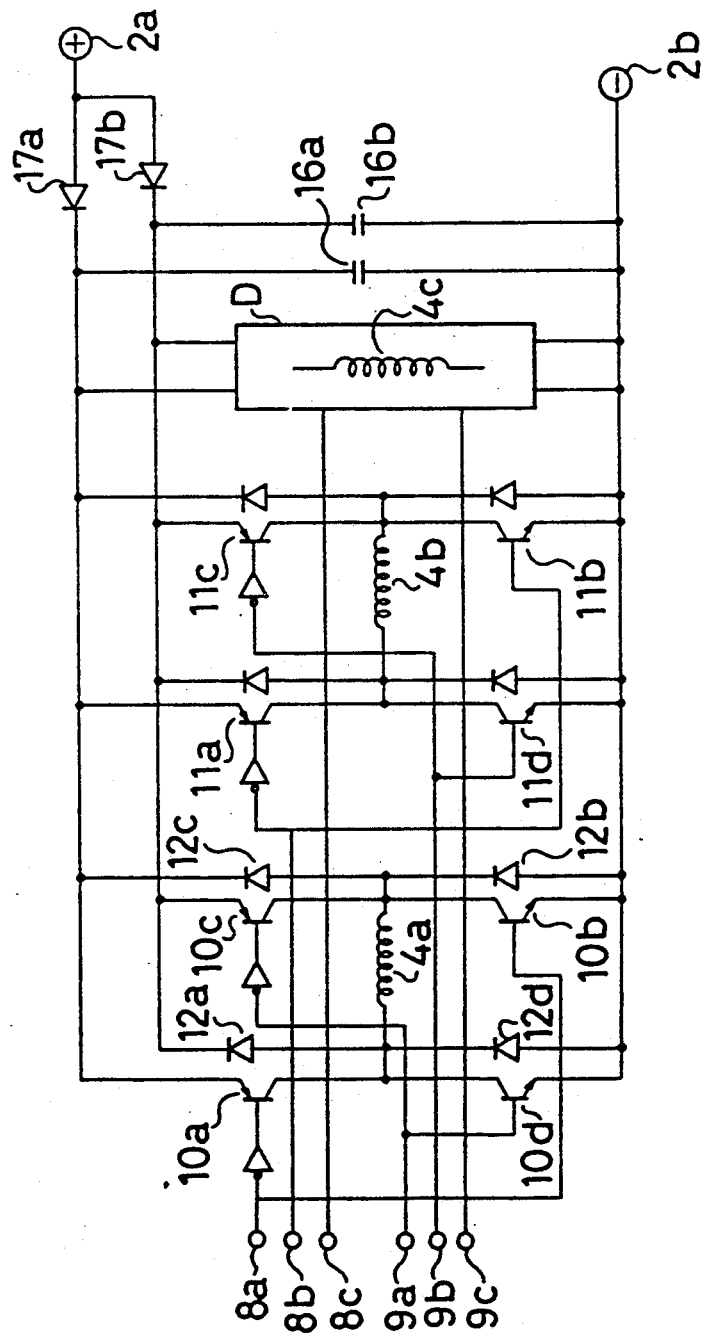
FIG. 6 is a diagram, similar to FIG. 3, showing a current supply controlling circuit mounted on a direct current motor according to a second embodiment of the present invention.

Next, with reference to FIG. 7, the operation of the current supply controlling circuit of FIG. 6 will be explained.

Figure 7:
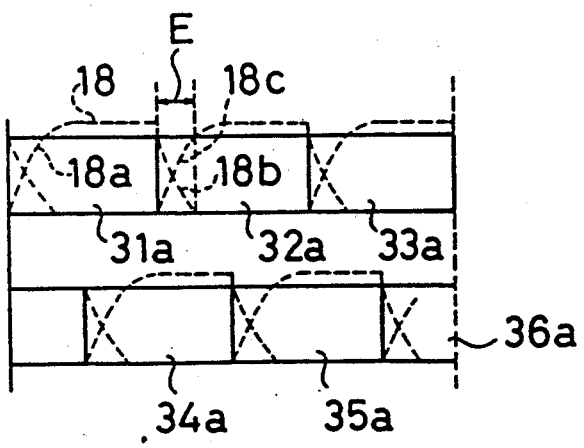
FIG. 7 is a diagram, similar to FIG. 4, showing the current supply controlling circuit of FIG. 6.

The current supply controlling circuit controls the current supply to the armature coils 4a-4c of respective phases in the forward direction in accordance with the first to third position detection signals (first position detection signal group) of FIG. 7 supplied to the input terminals 8a-8c, and controls the current supply to the armature coils 4a-4c of respective phases in the reverse direction in accordance with the fourth to sixth position detection signals (second position detection signal group) of FIG. 7 supplied to the input terminals 9a-9c.

The current supply controlling circuit receives first to third position detection signals from position detection devices such as the Hall elements 3a, 3b and 3c1. The signals from these elements have a width of 120 degrees of an electrical angle, and are successively generated without being superimposed on one another in time, and fourth to sixth position detection signals supplied from the position detecting device including the Hall elements that have phased differences of 60 degrees from the first to the third signals. The current supply controlling circuit responds to the first to sixth signals to cyclically energize transistors (10a-10d, 11a-11d) of transistor bridge circuits associated with the armature coils (4a-4c) of respective phases. The controlling circuit supplies currents to the armature coils of respective phases in the forward and reverse directions.

However, since the chopper control is not effected, as distinct from the first embodiment, the armature current is set to a value corresponding to a voltage applied to the current supply controlling circuit from the direct current power source terminals 2a and 2b.

When the current supply to the armature coil 4a in the forward direction is started in response to the first position detection signal 31a, the armature current flowing in the armature coil rises as shown by a broken line 18a in FIG. 7, and when the current supply is interrruped, it falls as shown by a broken line 18b. Then, when the current supply to the armature coil 4b in the forward direction is started in response to the second position detection signal 32a, the armature current flowing in the armature coil 4b rises as shown by a broken line 18c. An arrow E indicates the widths of the broken lines 18b and 18c, and like the first embodiment, it is a requisite for operating the electric motor at high speeds to cause the width to assume a value within 30 degrees. As is explained in the first embodiment, the above requirement is satisfied by the functions of the diodes 17a, 17b and capacitors 16a, 16b. The above requirement is also applied to the fall and rise of the armature current at the time of generation and extinction of the other position detection signals. In FIG. 7, the broken lines indicate the armature current curves, and the flat portion thereof is indicated by a symbol 18.

As is understood from the above explanation, according to the second embodiment, the circuit construction can be made simple in comparison with the first embodiment. In addition, the high speed characteristic and high efficiency of the electric motor can be held.

The present ivention is not limited to the above embodiments, but various modifications can be made.

For example, in the above embodiments, the diodes 17a, 17b are provided on the side of the power source positive terminal 2a, but the above diodes can be provided in the forward direction or in the current supply direction of the armature current on the side of the power source negative terminal 2b. In this case, the lower portion of the transistor bridge circuits shown in FIGS. 3 and 6 is connected to the power source negative terminal 2b via the diodes 17a and 17b. Further, in the first embodiment, the transistor on the upper side of the bridge circuit is on-off controlled for the chopper control, but it is also possible to on-off control the transistor on the lower side. In this case, the transistor on the lower side is kept off by an output of a monostable circuit which responds to outputs of the operational amplifiers 14a, 14b.

The advantages of the present invention are listed below.

(1) In a case where it is driven by a direct current power source obtained by rectifying an alternating current, the capacitance of the smoothing capacitor can be small. Therefore, generation of electrical noise is less, the power factor of the electric motor can be enhanced. In addition, an inexpensive and small power source can be used.

(2) Since the control of the current supply to the armature coil of each phase in the forward direction and the control for the reverse direction are separately and independently effected by using two control systems, the construction of the current supply controlling circuit can be made simple. Further, since position detection signals which are successively supplied without being superposed on each other are used, a 3-phase Y-connection electric motor operable at high speeds with a high efficiency can be provided only by adding a necessary number of diodes.

(3) Since the choppper circuit is jointly used, the output torque and rotation speed of the electric motor can be separately and independently controlled. That is, the rotation speed can be variably controlled by adjusting a voltage applied to the current supply controlling circuit, and the output torque can be variably controlled by adjusting the reference voltage applied to the chopper circuit.

I claim:

1. A direct current motor, comprising:
   a position detection device for sequentially supplying a plurality of position detection signals, corresponding in number to phases of a direct current motor and associated with the respective phases of the direct current motor, in dependence on a rotation position of a rotor of the direct current motor;
   a current supply controlling circuit connectable to a direct current power source, for sequentially supply currents to armature coils of respective phases in response to the position detection signals;
   circuit means for supplying a magnetic energy stored in one of said armature coils which is interrupted to be supplied with current into a next one of said armature coils which is to be next supplied with current a the time of interruption of current supply to the armature coil of the respective phase, thereby rapidly extinguishing the stored magnetic energy and rapidly raising an armature current flowing in the armature coil to be next supplied with current; and
   transistor bridge circuits respectively connected to the armature coils of the respective phases for turning on and off each of the transistors constituting said transistor bridge circuits in response to a corresponding position detection signals.

2. A direct current motor comprising:
   a position detection device for sequentially supplying a first position detection signal group including a plurality of position detection signals corresponding in number to phases of a direct current motor and associated with respective phases of the direct current motor and a second position detection signal group including a plurality of position detection signals with preset phases differences with respect to the corresponding position detection signals of the first position detection signal group, in dependence on a rotation position of a rotor of the direct current motor:
   a current supply controlling circuit connectable to a direct current power source, for sequentially supply currents to armature coils of respective phases in a forward direction in response to the first position detection signal group, and for sequentially supplying currents to the armature coils of respective phases in reverse direction in response to the second position detection signal group; and
   circuit means for supplying a magnetic energy stored in one of said armature coils which is interrupted to be supplied with current into a next one of said armature coils which is to be next supplied with current at the time of interruption of current supply to the armature coil of the respective phase, thereby rapidly extinguishing the stored magnetic energy and rapidly raising an armature current flowing in the armature coil to be next supplied with current.

3. A direct current motor according to claim 1, including:
   a chopper circuit for interrupting the current supply to the armature coil of the respective phase when the armature current flowing in the armature coil of the respective phase becomes larger than a upper limit value, and for restarting the current supply when the armature current becomes lower than a lower limit value.

4. A direct current motor according to claim 1, wherein said position detection device is arranged to sequentially and successively generate the position detection signals without being superposed on one another in time, each of the position detection signals having a preset width.

5. A direct current motor according to claim 1, wherein said position detection device includes a plurality of position detection elements for generating the position detection signals, said position detection elements corresponding in number to the phases of said direct current motor, being separated from one another by a preset electrical angle and fixed on an armature side of said direct current motor.

6. A direct current motor according to claim 5, wherein each of said position detection elements is fixed in that position at which each element is enabled to generate the position detection signals causing the current supply to the armature coil of respective phase to be effected in the maximum torque generation range.

7. A direct current motor according to claim 1, wherein said circuits means includes a diode group connected between said direct current power source and said armature coils of respective phases, for preventing the magnetic energy from being returned to said direct current power source.

8. A direct current motor according to claim 1, wherein said direct current motor is comprised of a 3-phase Y-connection direct current motor.

9. A 3-phase Y-connection direct current motor, comprising:
   a position detection device, including three position detection elements which are separated from one another by an electrical angle of 120 degrees, for detecting a position of a magnet rotor and for generating a first position detection signal group including a plurality of position detection signals each of which has an electrical angle of 120 degrees and which are sequentially and successively generated without being superposed on one another in time, and a second position detection signal group including a plurality of position detection signals each having a phase difference of an electrical angle of 60 degrees with respect to a corresponding one of said respective position detection signals;
   first, second and third transistor bridge circuits for respectively supplying currents to armature coils of the first-phase, second-phase and third-phase in the forward and reverse directions;
   a direct current power sourcer for supplying electric power to said first, second and third transistor bridge circuits;
   a current supply controlling circuit for sequentially and cyclically energizing transistors of said first, second and third transistor bridge circuits in response to the first position detection signal group so as to supply currents to said armature coils of respective phases in the forward direction and for sequentially and cyclically energizing the transistors of said first, second and third transistor bridge circuits in response to the second position detection signal group so as to supply currents to said armature coils of respective phases in the reverse direction, thereby generating an output torque exerting in one direction;

first and second diodes for prevention of reverse current flow, respectively connected in a forward direction between said direct current power source and the armature coils of the respective phases; and
an electric circuit for preventing, by use of said first and second diodes, magnetic energy stored in one of said armature coils from being returned, via a diode juxtaposed with said transistor, to a positive terminal of said direct current power source when said one armature coil is interrupted to be supplied with current at the end of the respective position detection signal, so that the magnetic energy is supplied to one of said armature coils which is to be supplied with current in response to a next position detection signal to thereby rapidly extinguish the magnetic energy, and for causing a current supply width, required for the armature current to rise to a preset value, to an extremely small width at initial portions of the current supply due to the magnetic energy discharge and of the position detection signal, so that a reduced-torque at an initial stage of the current supply and a countertorque at end stage of the current supply;
wherein said position detection elements are fixed on a fixed armature side so that a range in which currents are supplied to said armature coils in response to the position detection signals is consistent with a maximum torque generation range.

10. A direct current motor according to claim 9, including:
an armature current detection circuit for detecting armature currents flowing in said armature coils of respective phases, and for generating first and second detection signals respectively when the armature current has exceeded a present value and when the armature current becomes lower than the preset value by certain amount; and
a chopper circuit for interrupting and starting the current supply to said armature coils of respective phases in response to the first and second detection signals to control the armature current to said present value.

11. A direct current motor according to claim 2, including:
a chopper circuit for interrupting the current supply to the armature coil of respective phase when the armature current flowing in the armature coil of respective phase becomes larger than a upper limit value, and for restarting the current supply when the armature current becomes lower than a lower limit value.

12. A direct current motor according to claim 2, wherein said position detection device is arranged to sequentially and successively generate the position detection signals without being superposed on one another in time, each of the position detection signals having a preset width.

13. A direct current motor according to claim 2, wherein said position detection device includes a plurality of position detection elements for generating the position detection signals, said position detection elements corresponding in number to the phases of said direct current motor, being separated from one another by a preset electrical angle and fixed on an armature side of said direct current motor.

14. A direct current motor according to claim 2, wherein said current supply controlling circuit includes transistor bridge circuits respectively connected to the armature coils of respective phases for turning on and off each of transistors constituting said transistor bridge circuits in response to a corresponding position detection signals.

15. A direct current motor according to claim 2, wherein said circuit means includes a diode group connected between said direct current power source and said armature coils of respective phases, for preventing the magnetic energy from being returned to said direct current power source.

16. A direct current motor according to claim 2, wherein said direct current motor is comprised of a 3-phase Y-connection direct current motor.

* * * * *